INVENTORS.
Robert H. Kernohan
Stanley T. Sekula

ATTORNEY.

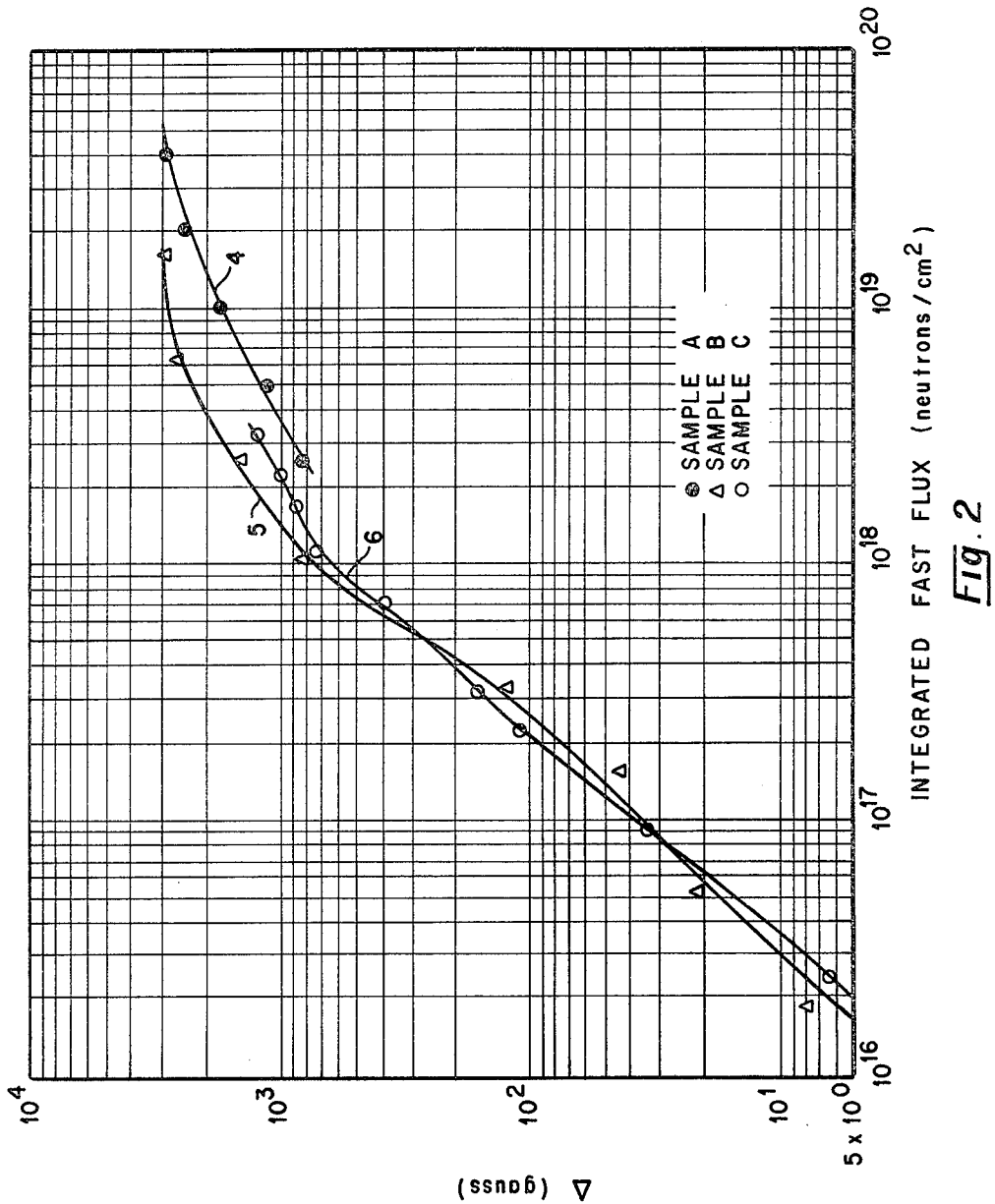

_United States Patent Office_

3,489,900
Patented Jan. 13, 1970

1

3,489,900
DOSIMETER FOR PERMANENTLY RECORDING THE EFFECTS OF AN INTEGRATED FAST NEUTRON DOSE
Robert H. Kernohan and Stanley T. Sekula, Oak Ridge, Tenn., assignors to The United States of America as represented by the United States Atomic Energy Commission
Filed Dec. 29, 1967, Ser. No. 694,706
Int. Cl. G01t 3/00
U.S. Cl. 250—83.1                                 4 Claims

ABSTRACT OF THE DISCLOSURE

Fast neutrons create defects in relatively pure niobium crystals and the remanent moment, or frozen-in magnetic flux in the crystals, produced by fast neutron bombardment can be determined from the isothermal magnetization curves. This remanent moment is proportional to the fast neutron dose from about $2 \times 10^{16}$ n/cm.$^2$ to about $10^{19}$ n/cm.$^2$. Thus, crystals of substantially pure niobium can permanently record the integrated fast neutron flux to which they have been exposed.

BACKGROUND OF THE INVENTION

The invention described herein was made in the course of, or under, a contract with the U.S. Atomic Energy Commission.

The present invention relates to the field of determining or measuring the fast neutron dose to which certain materials have been exposed, as within a nuclear reactor, for example.

Counter-type devices may be and have been used in the past for determining the fast neutron dose to materials. However, they are relatively large in size and require external circuitry. Another conventional means of determining the integrated fast neutron flux is to use certain substances, e.g., Ni, S, P, etc., and thereafter measure the radioactivity thereof as a means of determining the dose. This method has the problem of gradually decreasing activity as a function of time so that an accurate "record" of dose is lost unless the decay is taken into account. For this, the time interval after irradiation when the measurement is made must be accurately known.

Some investigators have studied the effects of neutron irradiation upon niobium as well as upon other superconducting materials. In the case of niobium, there has been little agreement by prior investigators as to the effect of neutron irradiation, possibly because of impurities within the test samples and of a lack of a thorough annealing procedure for the starting material. In other words there was no way to predict, prior to the present invention, that niobium could be used to accurately record the fast neutron dose to which the niobium was exposed.

SUMMARY OF THE INVENTION

It is the object of the present invention to provide a relatively small dosimeter means together with a method for permanently recording a parameter which is indicative of the amount of the integrated fast neutron dose from a radiation environment, wherein no external circuitry is required and there is no problem of decay such that the final determination of the actual neutron dose which is derived from the recorded parameter can be effected at any convenient time subsequent to recording of the parameter.

The above object has been accomplished in the present invention, while at the same time solving the problems of the prior art discussed above, by utilizing a very pure and well annealed niobium crystal which is placed adjacent to a source of neutron irradiation. It has been discovered that the neutron flux from the neutron source will effect a permanent or "frozen-in" magnetic flux or remanent moment in the niobium crystal which is reproducibly proportional to the integrated fast neutron dose. The crystal can then be used to ascertain the fast neutron dose, with conventional devices by measuring magnetization curves while immersed in liquid helium.

BRIEF DESCRIPTION OF THE DRAWINGS

FIG. 2 is a plot of the logarithm of integrated fast flux (neutrons/cm.$^2$) versus the logarithm of the remanent moment (gauss) for three samples of relatively pure niobium.

DESCRIPTION OF THE PREFERRED EMBODIMENT

Figure 1:
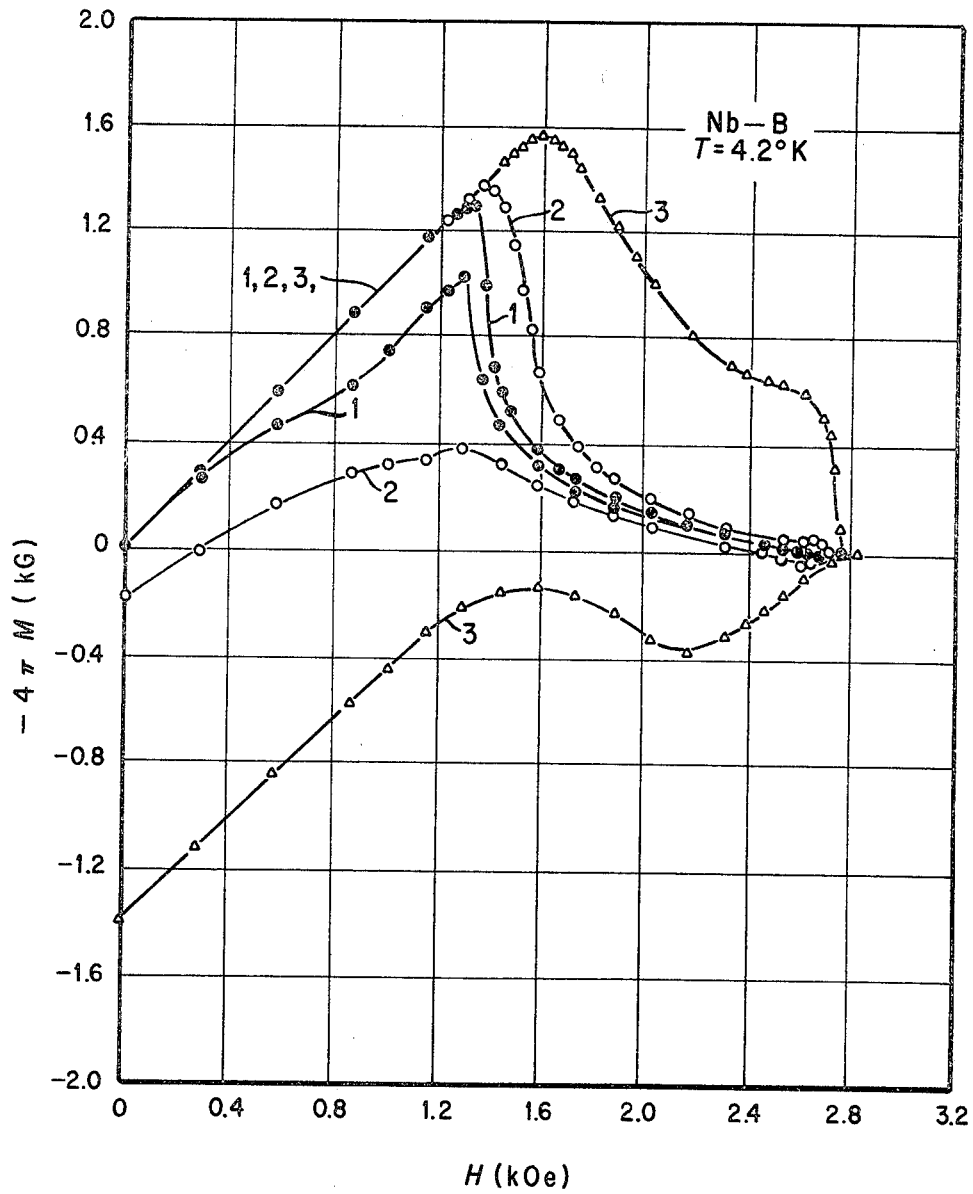
FIG. 1 is a plot illustrating typical isothermal magnetization curves for a relatively pure niobium single crystal, both before neutron irradiation and after two separate doses of neutrons.

The single crystals of zone refined niobium utilized in the present invention are in the form of cylindrical rods 3 mm. in diameter and 25 mm. in length which were cut from a rod approximately 200 mm. in length on an abrasive cutting wheel. The edges of the crystals were rounded to minimize the magnetic irreversibilities inherent to poor geometry. In order to remove any effects of excessive deformation at the ends due to the abrasive cutting, some of the crystals were annealed for 5 hours at 2000° C. in a vacuum of less than $5 \times 10^{-7}$ torr.

The major impurities of a typical niobium crystal sample, A, without annealing, and of a typical niobium crystal sample, B, after annealing, which were determined by a number of conventional analytical techniques, are given in Table I below.

TABLE I

| Sample | Impurity (p.p.m.) | | | | | |
|---|---|---|---|---|---|---|
|  | Ta | W | Zr | O$_2$ | N$_2$ | C |
| Nb-A | 370 | 230 | 15 | 30 | 24 | 11 |
| Nb-B | 370 | 230 | 15 | <5 | <5 | <5 |

It can be seen from the table that the annealing treatment decreased the interstitial impurity content in the sample Nb–B. An investigation of the effect of fast neutron irradiation upon a typical Nb–B sample of a well annealed niobium crystal containing a minimum of impurities has revealed that there is a reproducible change in the superconducting properties thereof. In particular, it has been found that neutron irradiation creates large changes in magnetization curves measured at liquid helium temperature as shown in FIG. 1. Prior to irradiation, very pure and well annealed niobium is characterized by a nearly reversible magnetization curve which returns to almost zero magnetic induction ($4\pi M$) as the external field goes to a maximum and is then returned to zero. This initial condition is illustrated by the curve 1 of FIG. 1.

After neutron irradiation, the magnetization curve is much less reversible and depends upon the neutron dose. Curve 2 of FIG. 1 is the magnetization curve of the same sample after a neutron irradiation of $4.3 \times 10^{17}$ n/cm.$^2$, and curve 3 is the magnetization curve of the same sample after a neutron irradiation of $2.6 \times 10^{18}$ n/cm.$^2$. The curves 2 and 3 of FIG. 1 are characterized by a "frozen-in" magnetic flux or remanent moment, i.e., a value of $4\pi M$ after the external field is brought to zero. The microscopic defects produced in the niobium crystal by fast neutron bombardment are effective in pinning or freezing the magnetism in the niobium sample crystal. The amount of this "frozen-in" magnetic flux is proportional to the integrated fast flux (dose) in the range of about $10^{16}$ to nearly $10^{19}$ neutrons/cm.$^2$. As can be seen from FIG. 1, the departure from the equilibrium state increases with increasing neutron doses, which indicates an increase in the density and effectivess of the flux pinning sites in the sample crystal, as a function of the neutron dose.

The results of tests on three substantially pure niobium single crystals are shown in FIG. 2. Crystal A, represented by curve 4, is known to have a greater impurity content than either crystal B or crystal C, represented by curves 5 and 6, respectively. The difference in impurity content apparently accounts for the differences in the slopes of the Remanent Moment vs. Integrated Fast Neutron Flux plots. It can be seen that these plots have a uniform slope over most of the above-mentioned range when the parameters are both plotted logarithmically.

The frozen-in magnetic flux is permanently retained by the niobium crystal even though the crystal is not stored at superconducting temperatures. Thus, single crystals of pure niobium can permanently "record" the integrated fast neutron flux to which they have been exposed. Another advantage of using a substantially pure and well annealed niobium crystal for recording neutron dose is that no external circuitry is required during irradiation. The niobium crystals do become slighly radioactive, but not dangerously so, because (1) they can be wrapped in cadmium foil to prevent thermal neutron activation, (2) they are substantially pure, and (3) they are small.

Absolute values of the remanent moment are dependent to some extent on the sample size and geometrical shape, as well as upon the temperature during irradiation, but the physical dimensions of the niobium sample used to permanently record the neutron dose are not critical parameters and the dimensions of the crystals utilized in the present invention as set forth hereinabove are by way of example only.

Since the niobium crystal samples are small, as indicated above, they may be inserted into a nuclear reactor along with other materials whose response to fast neutrons is to be measured. The crystal samples can then be used to ascertain the fast neutron dose by immersing the sample in liquid helium and measuring the magnetization curves with conventional devices. Since the amount of the "frozen-in" magnetic flux in each niobium crystal is proportional to the integrated fast neutron flux (dose) to which the crystal has been exposed, the neutron dose can readily be ascertained from the magnetization curve obtained from the neutron irradiated crystal.

One method for effecting isothermal magnetization measurements is by means of the extraction technique. In such a method, the sample crystal is moved in a uniform field from one sample coil to another coil wound in opposition, and integrating the resultant pulse on a ballistic galvanometer. To minimize end effects in these measurements, the sample coils were somewhat shorter in length (12 mm.) than the samples which are about 25 mm. in length as indicated hereinabove. The uniform longitudinal magnetic field required for these measurements was supplied by a Nb-Zr sixth-order superconducting solenoid capable of generating a maximum field of 15 Koe. The combined sensitivity of galvanometer, sample coils, and a 3-mm.-diameter sample was found to correspond to a flux density of 0.2 gauss. The small demagnetization effects, occurring as a result of sample geometry, were taken into account from studies of Pb samples of similar size and shape.

For measurements above the critical temperature of liquid helium, the assembly of sample coils and sample crystal can be isolated from the liquid helium bath in a tube containing helium exchange gas at a pressure of approximately 5 mm. Hg. By supplying electrical power to a heater wound bifilarly and non-uniformly around the sample coils, a uniform temperature zone at arbitrary temperatures can be established. Temperatures were measured to an estimated accuracy of $0.03°$ K. by means of a Minneapolis-Honeywell Ge thermometer mounted directly above the sample crystal. The transition temperature of the samples was determined by monitoring the induced magnetic moment in a constant field of 7 oe. while varying the temperature.

The manner in which the sample crystals may be irradiated for determining fast neutron doses will now be described. Prior to irradiation, the sample crystals were enclosed in a Cd tube of 1 mm. wall thickness with perforated cadmium caps on the ends. This tube was then placed in a perforated aluminum "rabbit" 16 mm. in diameter and about 7.5 cm. in length. This assembly was then irradiated in a hydraulic facility of a nuclear reactor. In this facility, provisions were made to circulate demineralized water at a temperature of $40°$ C. through the rabbit and cadmium tube to minimize excessive heating of the sample crystals due to gamma-ray absorption. After irradiation, the rabbit was stored in water at room temperature for several days before being opened in a hot cell to remove the sample crystals for subsequent measurements to determine the isothermal magnetization curves for each of the samples.

This invention has been described with respect to a substantially pure and well annealed niobium crystal, identified above as Nb-B. It should be understood that the performances of the substantially pure niobium crystal, identified above as Nb-A, when subjected to the same tests as for crystal Nb-B, was comparable with the results obtained for the crystal Nb-B. A comparison of the respective test results of the two crystals reveals that the hysteresis is greater in the purer sample crystal (Nb-B) for an equivalent irradiation. This would indicate that the initial dislocation density and intersitial impurity content inhibit, to some extent, the creation of flux pinning defects by fast neutron irradiation. For this reason, the use of the Nb-B crystal for the detection of fast neutrons is preferred over the less pure crystal.

This invention has been described by way of illustration rather than by limitation and it should be apparent that it is equally applicable in fields other than those described.

What is claimed is:

1. A method of permanently recording the effects of the integrated fast neutron dose from a source of radiation comprising the steps of placing a substantially pure niobium crystal adjacent to said radiation source to receive the fast neutron flux therefrom, said fast neutron flux effecting a "frozen-in" magnetic flux or remanent moment in said niobium crystal, and removing said crystal from said source, whereby the magnetization curve which is obtainable from said irradiated crystal can provide an indication proportional to the integrated fast neutron dose to which said crystal has been exposed.

2. The method set forth in claim 1, which includes the additional step of annealing said crystal for 5 hours at $2000°$ C. in a vacuum of less than $5 \times 10^{-7}$ torr prior to said neutron irradiation step.

3. An improved dosimeter for permanently recording the effects of the integrated fast neutron flux from a source of radiation when said dosimeter is exposed to said source, comprising a substantially pure niobium crystal, said neutron flux effecting a "frozen-in" magnetic flux or remanent moment in said crystal which is indicative of and proportional to the integrated fast neutron dose from said radiation source.

4. The dosimeter set forth in claim 3, wherein said dosimeter crystal has a diameter of 3 mm. and a length of 25 mm., and is well annealed, said annealed niobium crystal having the following impurity contents therein: 370 p.p.m. Ta, 230 p.p.m. W, 15 p.p.m. Zr <5 p.p.m. $O_2$. <5 p.p.m. $N_2$, and <4 p.p.m. C.

References Cited

UNITED STATES PATENTS

| | | | |
|---|---|---|---|
| 2,988,639 | 6/1961 | Welker | 250—83.1 |
| 3,225,197 | 12/1965 | Basso | 250—83.1 |

ARCHIE R. BORCHELT, Primary Examiner